United States Patent
June et al.

(10) Patent No.: US 11,267,997 B2
(45) Date of Patent: Mar. 8, 2022

(54) FRICTION-ACTIVATED ADHESIVE FORMULATIONS AND APPLICATION DEVICES

(71) Applicant: 3M INNOVATIVE PROPERTIES COMPANY, St. Paul, MN (US)

(72) Inventors: Stephen M. June, Woodbury, MN (US); Nicole M. Beveridge, Stillwater, MN (US); Ying-Yuh Lu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 74 days.

(21) Appl. No.: 16/779,709

(22) Filed: Feb. 3, 2020

(65) Prior Publication Data

US 2020/0165496 A1 May 28, 2020

Related U.S. Application Data

(63) Continuation of application No. 15/105,131, filed as application No. PCT/US2014/070486 on Dec. 16, 2014, now abandoned.

(60) Provisional application No. 61/916,601, filed on Dec. 16, 2013.

(51) Int. Cl.
| | |
|---|---|
| *C09J 133/06* | (2006.01) |
| *C09J 9/00* | (2006.01) |
| *C09J 201/02* | (2006.01) |
| *C08L 33/06* | (2006.01) |
| *C08F 220/10* | (2006.01) |

(52) U.S. Cl.
CPC ............ *C09J 133/06* (2013.01); *C09J 9/005* (2013.01); *C09J 201/02* (2013.01); *C08F 220/10* (2013.01); *C08L 33/06* (2013.01)

(58) Field of Classification Search
CPC ........ C09J 133/06; C09J 9/005; C09J 201/02; C28L 33/06
See application file for complete search history.

(56) References Cited

U.S. PATENT DOCUMENTS

| | | | |
|---|---|---|---|
| 4,066,600 A | | 1/1978 | Pletcher et al. |
| 5,604,268 A | | 2/1997 | Randen et al. |
| 5,827,913 A | | 10/1998 | Baetzold et al. |
| 6,136,119 A | * | 10/2000 | Columbus ............... C08L 91/06 156/73.5 |
| 7,073,965 B2 | | 7/2006 | Look et al. |
| 2008/0064843 A1 | * | 3/2008 | Daly ....................... C08G 18/10 528/31 |

FOREIGN PATENT DOCUMENTS

| | | | |
|---|---|---|---|
| EP | 0902816 B1 * | 9/2002 | ............ C09J 151/00 |
| EP | 0902816 B1 | 9/2002 | |
| JP | S51-30838 | 3/1976 | |
| JP | 2003-064343 | 3/2003 | |
| JP | 2005-336680 | 12/2015 | |
| WO | WO 1999/028404 * | 6/1999 | |
| WO | WO 1999/028404 A1 | 6/1999 | |
| WO | WO 2006/082661 | 8/2006 | |

OTHER PUBLICATIONS

Agirre et al. (ACS Applied Materials and Interfaces, vol. 2, No. 2, Feb. 2010, pp. 443-451) (Year: 2010).*
Agirre, "Waterborne, Semicrystalline, Pressure-Sensitive Adhesives with Temperature-Responsiveness and Optimum Properties", ACS Applied Materials & Interfaces, vol. 2, No. 2, Jan. 14, 2010, pp. 443-451, XP055171602.
Office Action from Chinese Patent Application No. 201480068210.2 issued from SIPO dated Mar. 15, 2018, 15 pages.
PCT Search Report for PCT/US2014/070486, prepared by the European Patent Office, Rijswijk, dated Apr. 3, 2015.
Sigma-Aldrich, Reference: Polymer Properties, accessed Dec. 5, 2017 from <https://www.sigmaaldrich.com/content/dam/sigma-aldrich/docs/Aldrich/General_Information/thermal_transitions_of_homopolymers.pdf> 2017.
Zidong Li et al., "Handbook of Applied Adhesive Raw Materials", p. 211, National Defense Press, Jul. 1999.

\* cited by examiner

*Primary Examiner* — Kelly M Gambetta
(74) *Attorney, Agent, or Firm* — 3M IPC

(57) ABSTRACT

A solid thermoplastic semi-crystalline friction-activated adhesive composition comprising the mixture of:
  (a) from about 50 to about 100 parts by weight of a semi-crystalline adhesive polymer that comprises:
   (1) crystalline monomer having an alkyl carbon length of at least 16 carbon atoms;
   (2) non-crystalline monomer having a homopolymer $T_g$ below about 80° C.;
   (3) waxy, soft monomer having an average pendant alkyl carbon length of at least 14 carbon atoms;
   (4) monomer having acid or base functionality;
   (5) functional or non-functional macromere having a $T_m$ from about 40 to about 120° C.;
  (b) 0 to about 50 parts by weight of tackifier;
  (c) 0 to about 50 parts by weight of crystalline additive;
  (d) 0 to about 50 parts by weight of filler;
  (e) 0 to about 30 parts by weight of oil; and
  (f) 0 to about 50 parts by weight of one surfactant.
Also glue crayons and other application devices comprising such adhesive compositions.

28 Claims, No Drawings

FRICTION-ACTIVATED ADHESIVE FORMULATIONS AND APPLICATION DEVICES

CROSS REFERENCE TO RELATED APPLICATIONS

This application is continuation of U.S. application Ser. No. 15/105,131, filed Jun. 16, 2016, which is the § 371 U.S. National Stage of International Application No. PCT/US2014/070486, filed Dec. 16, 2014, which claims the benefit of U.S. Provisional Application No. 61/916,601, filed Dec. 16, 2013, the disclosures of which are incorporated by reference in their entirety herein.

FIELD

This invention relates to friction-activated adhesive formulations and application devices (e.g., glue crayons) for such adhesive formulations.

BACKGROUND

The use of adhesives is commonplace. Commonly used adhesives are available as liquids, semisolid or stick forms, paste, or as solids which must be activated with water, heat, or a solvent for use. Many adhesives use one or more solvents, which, are subject to evaporation resulting in drying out of the composition rendering it unusable. Alternatively, there can be some type of curing mechanism after application to secure a bond.

Many adhesive materials require special storage conditions or packaging, both during distribution, sale, etc., and throughout service life. For example, conventional white glue and glue sticks must be kept tightly sealed or the solvent components thereof can escape, making the adhesive unusable for future applications.

Although solid adhesive sticks of friction-activated adhesive have been known for some time, they have not been sufficiently user-friendly.

Some solid adhesive sticks have poor writability, minimal tack, minimal open (bonding) time, and poor adhesion properties. Other solid adhesive sticks are difficult to apply to surfaces, sometimes requiring the adhesive to be applied to both surfaces being bonded, necessitating rubbing several times with a hard object to ensure bonding, sometimes requiring the use of very high pressures or temperatures to bond (well above what a child or person could apply by simply rubbing with their hand or finger).

U.S. Pat. No. 5,604,268 (Randen et al.) discloses a 100% solids friction-activated adhesive that typically contains a minimum of about 4 parts by weight of a "tackifying monomeric unit having a glass transition temperature ($T_g$) in the range of about 100° C." (e.g., $T_g$ in the range of 80° to 110° C.).

The need exists for better friction adhesive formulations that easily apply with minimal writing pressure, produce an even coat of adhesive, and offer both good initial tack and eventual permanence.

SUMMARY

The present invention provides novel friction-activated adhesive formulations that provide surprising improved performance. The present invention also provides application devices for applying such adhesive formulations.

In brief summary, the present invention provides glue crayons comprising semi-crystalline polymers, tackified semi-crystalline polymers, semi-crystalline polymers containing specific pendent macromeric units, semi-crystalline polymers containing high chain length alkyl monomers, semi-crystalline polymers containing both macromeric and high chain length alkyl groups, semi-crystalline polymers containing crystalline additives, and semi-crystalline polymers containing surfactants as described herein.

In some embodiments formulations of the invention are a solid thermoplastic friction-activated adhesive composition comprising, and in some embodiments consisting essentially of, the mixture of:
  (a) from about 50 to about 100 parts by weight per 100 parts by weight of adhesive composition of a semi-crystalline adhesive polymer and comprises:
    (1) from about 5 to about 96, typically preferably from about 5 to about 60, parts by weight per 100 parts by weight of adhesive polymer of at least one crystalline monomer having an alkyl carbon length of at least 16, typically up to no more than 50, carbon atoms;
    (2) from about 4 to about 70, typically preferably from about 12 to about 59, parts by weight per 100 parts by weight of adhesive polymer of at least one non-crystalline monomer having a homopolymer glass transition temperature ($T_g$) below about 80° C.;
    (3) 0 to about 70 parts by weight per 100 parts by weight of adhesive polymer of at least one waxy, soft monomer having an average pendant alkyl carbon length of at least 14, typically no more than 50, carbon atoms;
    (4) 0 to about 10, typically preferably from about 0.5 to about 3, parts by weight per 100 parts by weight of adhesive polymer of at least one monomer having acid or base functionality;
    (5) 0 to about 40, typically preferably from 0 to about 30, parts by weight per 100 parts by weight of adhesive polymer of at least one functional or non-functional macromer having a melting temperature ($T_m$) from about 40° C. to about 120° C.;
  (b) 0 to about 50, typically preferably from about 5 to about 40, parts by weight per 100 parts by weight of adhesive composition of at least one tackifier;
  (c) 0 to about 50 parts by weight per 100 parts by weight of adhesive composition at least one crystalline additive;
  (d) 0 to about 50 parts by weight per 100 parts by weight of adhesive composition of at least one filler;
  (e) 0 to about 30 parts by weight per 100 parts by weight of adhesive composition of at least one oil; and
  (f) 0 to about 50 parts by weight per 100 parts by weight of adhesive composition of at least one surfactant.

Adhesive formulations of the invention may be used in a variety of application devices. For instance, these adhesive formulations can be molded into the shape of a crayon (or other desired shape, e.g., typically suited for holding by hand), typically with a removable wrapper or covering, and used by hand to deposit effective quantities of adhesive composition onto a substrate. Adhesive formulations of the invention can also be filled into a container, similar to a conventional water-based glue stick (e.g., an outside tube with a progressively advancable elevator), or molded into a desired shape and then placed into an applicator (similar to a pencil style click eraser). These options allow for the best possible application experience for the consumer.

To use the adhesives of the invention, a mass of the adhesive, commonly configured in an application device such as is described herein or similar thereto, is rubbed against a desired adherend substrate.

The frictional heat generated during application melts the polymers in the adhesive formulation so as to result in transfer of adhesive from the adhesive body to the surface of the adherend, resulting in formation of a tacky adhesive deposit thereon. Functional glue crayons that are both writable and will deposit a fugitive, tacky adhesive can be prepared from the base semi-crystalline and the tackified semi-crystalline polymers. Functional glue crayons with improved temperature storage stability can be prepared from those semi-crystalline polymers containing the higher chain length alkyl groups and from those polymers containing the crystalline additives. Functional glue crayons with improved writability and improved temperature stability can be prepared from those semi-crystalline polymers containing the macromeric groups and more preferably from those semi-crystalline polymers which contain both the macromeric groups and the higher chain length alkyl groups. In addition specific crystalline additives can be added to the tackified semi-crystalline adhesives and the macromer semi-crystalline adhesives to obtain similar improved temperature stability. Glue crayons that are both functional and have higher temperature stabilities provide a significant improvement over the crayons in the background literature.

The invention also provides glue crayons comprising, and in some embodiments, consisting essentially of, such compositions. Such glue crayons offer excellent storage and handling stability.

Adhesives of the invention can be used in numerous formats, typically in the form of an adhesive crayon. Illustrative advantages of adhesives and glue crayons of the invention include long term stability, i.e., no tendency to dry out or cure over time, reduced tendency to wrinkle paper as compared to many commercial glue sticks and white glues, no requirement for a special applicator, and enhanced precision of adhesive delivery even by hand application.

Advantageously, glue crayons of the present invention form secure bonds but do not dry out or require barrier type packaging to prevent loss of components that could lead to detrimental product performance. Furthermore, with such properties, minimal and less wasteful packaging options are available. An additional benefit is the solid form of the stick which prevents dripping and spilling and accidental application, which is common with the current forms of liquid adhesive. Another advantage of glue crayons of the invention is that the properties of the composition are such that a youngster can readily draw or write with the glue crayon.

Glue crayons of present invention are particularly useful in school, home and office markets as a method to deliver a controlled quantity of an adhesive to a specific application site/area for light-duty, adhesion tasks with paper, cardboard, wood, craft materials, etc. The glue crayon formulations of the present invention provide an improvement over the art by providing good writability (easy application), good tackiness (finger tack), good instant adhesion (quick stick), good open time (time to form bond), and require low application pressures (simple rubbing with the hand or finger) to form a bond.

Other advantages of the present invention over many commercially available alternatives include: (1) no volatile organic solvent problems, such as flammability, toxicity and odor; (2) when not in use and in particular, uncapped, no dry out like the water-based glue sticks; (3) instant tack, that is, there is no waiting period for the adhesive to "dry" after application; (4) no paper substrate cockling that is sometimes seen with the aqueous based, glue stick adhesives; (5) no expensive containers required; and (6) ease of use by adults and children, alike.

A major distinction between the glue crayons disclosed in U.S. Pat. No. 5,604,268 (Randen et al.) and those of the invention relates to composition of the adhesive polymer, in particular, incorporation of a non-crystalline monomer there. The reference teaches that it is critical to that the adhesive polymer comprise at least one non-crystalline monomer with a homopolymer $T_g$ in the range of about 100° C., i.e., from about 80° C. to about 110° C. Surprisingly, we have found that high performing glue crayons can be made without using such a component, using relatively lower $T_g$ materials instead. That this is surprising is highlighted by the disclosure of the reference where such high $T_g$ monomer is taught to act as a tackifying monomer, increasing the overall $T_g$ and modulus enough to provide decent adhesion. We have found that this can be achieved even without that component, so long as there is some non-crystalline component to disrupt the crystallinity provided by all the other monomers. By using such lower $T_g$ materials instead, formulations of the invention can be made with reduced cost, and increased synthetic flexibility, with the final composition provide improved writability as compared to otherwise similar formulations in accordance with the teaching of the reference.

Key and Glossary

For the following defined terms, these definitions shall be applied, unless a different definition is given in the claims or elsewhere in this specification.

The term "crystalline monomer" means a monomer whose homopolymer has a melting temperature ($T_m$) of from about 45° C. to about 68° C.

The term "macromer" means a low molecular weight polymer which may or may not contain telechelic functionality.

The term "open time" is the time period that the applied adhesive remains tacky enough to form a bond with another substrate.

The term "polymer" includes polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "solid" means materials that are substantially self-supporting at room temperature (i.e., 20° C. to 25° C.) such that if left at rest they will retain their shape without deforming or flowing.

The term "tacky" means sticky to the touch.

The term "telechelic" means a polymer or prepolymer containing one or more function end groups that have the capacity for selective reaction to form bonds with another molecule and the functionality of a telechelic polymer or prepolymer is equal to the number of such end groups.

The term "waxy" means monomers whose homopolymer has a $T_m$ from about 25 to about 44° C.

The term "writability" refers to the ease of deposition of the adhesive onto a substrate.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition or indicated component thereof and multiplied by 100.

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

DETAILED DESCRIPTION OF ILLUSTRATIVE EMBODIMENTS

To be effective and consumer-friendly, a glue crayon has to be easy to apply. Such an article should provide the required adhesion properties and be physically stable. The latter means that the glue crayon should not be exceedingly tacky when not being used or transfer adhesive to one's hand when being used.

Specifically, glue crayons of the present invention have the following properties. First, glue crayons should have a melting temperature ($T_m$) above room temperature, that is, the crayon resists flowing up to temperatures of about 50° C., and typically preferably above 60° C. to be a good, stable glue crayon product. Such temperatures might typically be seen in storage or transport situations. Second, glue crayons are preferably melted by frictionally generated heat when the glue crayon is rubbed on a substrate, such as paper. Third, the melted/softened adhesive readily transfers to the substrate. Fourth, this melted, transferred polymer has to wet the substrate and then function as a pressure sensitive adhesive. Fifth, the adhesive must remain tacky for a period of time in order to adhere other items thereon, that is, have acceptable "open times". During this time the adhesive has enough strength to hold the adhered items together until a more durable bond is formed by re-solidification or crystallization.

For example, when adhering paper products together, this more durable bond should tear paper or pull out paper fibers when the two adherents are pulled apart, rather than failing at the adhesive interface or cohesively. Paper tear/fiber pull would indicate that there is more than sufficient bond strength for the application.

Adhesive compositions of the present invention is a solid adhesive stick which contains no volatile solvent that is applied by rubbing on a surface that causes frictional heating at the tip of the stick. The adhesive warms to above its melt temperature that causes it to melt and transfer to the surface by the shearing action imparted by the rubbing action.

Commercially available adhesive glue sticks use polyvinyl pyrrolidone polymers in an aqueous sodium stearate gel system. Several disadvantages of the latter include that they require an expensive container to prevent the product from drying out, they don't provide immediate finger tack during application and they often-times cockle or wrinkle paper.

As described above, in some embodiments formulations of the invention are a solid thermoplastic friction-activated adhesive composition comprising, and in some embodiments consisting essentially of, the mixture of:
   (a) from about 50 to about 100 parts by weight per 100 parts by weight of adhesive composition of a semi-crystalline adhesive polymer that comprises:
      (1) from about 5 to about 96, typically preferably from about 5 to about 60, parts by weight per 100 parts by weight of adhesive polymer of at least one crystalline monomer having an alkyl carbon length of at least 16, typically up to no more than 50, carbon atoms;
      (2) from about 4 to about 70, typically preferably from about 12 to about 59, parts by weight per 100 parts by weight of adhesive polymer of at least one non-crystalline monomer having a homopolymer $T_g$ below about 80° C.;
      (3) 0 to about 70 parts by weight per 100 parts by weight of adhesive polymer of at least one waxy, soft monomer having an average pendant alkyl carbon length of at least 14, typically no more than 50, carbon atoms;
      (4) 0 to about 10, typically preferably from about 0.5 to about 3, parts by weight per 100 parts by weight of adhesive polymer of at least one monomer having acid or base functionality;
      (5) 0 to about 40, typically preferably from 0 to about 30, parts by weight per 100 parts by weight of adhesive polymer of at least one functional or non-functional macromer unit having a $T_m$ from about 35° C. to about 120° C.;
   (b) 0 to about 50, typically preferably from about 5 to about 40, parts by weight per 100 parts by weight of adhesive composition of at least one tackifier;
   (c) 0 to about 50 parts by weight per 100 parts by weight of adhesive composition at least one crystalline additive; and
   (d) 0 to about 50 parts by weight per 100 parts by weight of adhesive composition of at least one filler;
   (e) 0 to about 30 parts by weight per 100 parts by weight of adhesive composition of at least one oil; and
   (f) 0 to about 50 parts by weight per 100 parts by weight of adhesive composition of at least one surfactant.

Crystalline Monomer

The crystalline monomer component is one or more reactive species, typically preferably having a pendant alkyl unit of at least 16, typically no more than 50, carbon atoms. Illustrative examples of preferred embodiments of the crystalline monomer are crystalline $C_n$ (meth)acrylates, crystalline vinyl monomers, crystalline glicidyl monomers, crystalline caprolactones, crystalline hydrofurans, and similar structures known to those skilled in the art.

The adhesive polymer of compositions of the invention comprise from about 5 to about 96, typically preferably from about 5 to about 60, parts by weight, per 100 parts by weight of the polymer, of such crystalline monomer. Adhesive compositions made with adhesive polymer compositions comprising too little of such crystalline monomer will tend to be too soft, undesirably sticky to touch, and too gummy to form an acceptable crayon, whereas those made with compositions comprising too much of such component will tend to be too hard to use and too brittle to form a functional crayon.

Non-Crystalline Monomer

Useful embodiments of the non-crystalline monomer include amorphous monomers having a homopolymer $T_g$ less than about 80° C., with typically preferred embodiments having a homopolymer $T_g$ less than about 40° C., and most preferred embodiments having a homopolymer $T_g$ less than about 25° C. Preferred structures include non-crystalline $C_n$ (meth)acrylates where n is greater than or equal to 1, non-crystalline vinyl monomers with at least two pendant atoms, non-crystalline vinyl ethers with at least 2 pendant atoms, non-crystalline vinyl esters with at least four pendant atoms, non-crystalline polyether (meth)acrylates with at least one repeat unit, non-crystalline polysiloxane (meth) acrylates with at least one repeat unit, and similar structures known to those skilled in the art.

The crystalline monomer component and non-crystalline monomer component are selected such that when combined the non-crystalline component disrupts the crystallinity of the resultant adhesive polymer composition to an extent that the resultant composition will exhibit a melting temperature ($T_m$) of about 30° C. In many embodiments, the composition will exhibit a major $T_m$ in the range of about 25° C. to about 35° C. Typically the adhesive polymer will exhibit additional $T_m$ inflections.

Illustrative examples include, but are not limited to, isooctyl acrylate, 2-ethyl hexyl acrylate, 2-octyl acrylate, n-octyl acrylate, n-butyl acrylate, sec-butyl acrylate, ethyl acrylate, diethyleneglycol methyl ether acrylate, triethyleneglycol methyl ether acrylate, allyl glycidyl ether, ethyl vinyl ether, 2-ethyl hexyl vinyl ether, hydroxyl ethyl acrylate, dodecyl methacrylate, dodecyl vinyl ether, polydimethylsiloxyl and amorphous polyether (meth)acrylates, and the like.

The adhesive polymer of compositions of the invention comprise from about 4 to about 70, typically preferably from about 12 to about 59, parts by weight per 100 parts by weight of adhesive polymer of at least one non-crystalline monomer having a $T_g$ below about 80° C. Adhesive compositions made with adhesive polymer compositions comprising too little of such non-crystalline monomer will tend to have poor adhesive transfer and form undesirably brittle crayons whereas those made with compositions comprising too much of such component will tend to be too soft and gummy, forming insufficiently solid stick.

Preferably the selection of types and proportions of crystalline monomer(s) and non-crystalline polymer(s) is such that the resultant adhesive polymer has a $T_m$ of around about 25° C. to about 35° C. so that the resultant adhesive composition can be used effectively and easily under ordinary conditions.

In distinction to the adhesive compositions disclosed in U.S. Pat. No. 5,604,268 which teaches that a relatively high $T_g$ (i.e., in the range of 80° C. to 110° C.) material be used as a tackifying monomer to raise the modulus of the adhesive composition, we have discovered that instead a non-crystalline monomer component as described herein can be used to disrupt the crystalline nature of the composition such that the resultant adhesive composition will be desirably tacky. In addition to the surprising performance achieved by adhesive compositions of the invention, the non-crystalline monomers employed in accordance with the invention are typically relatively cheaper to obtain and use than are the high homopolymer $T_g$ materials described in the reference.

Advantages of using the low $T_g$ materials described herein include better writability, and in many instances simplified processing to make adhesive compositions and application devices of the invention.

Waxy, Soft Monomer

Preferred embodiments of the semi-crystalline waxy monomer are crystalline $C_n$ (meth)acrylates with pendant chains having at least 14 carbon atoms, crystalline vinyl monomers with pendant chains having at least 14 carbon atoms, crystalline glicidyl monomers with pendant chains having at least 14 carbon atoms, crystalline caprolactones with pendant chains having at least 14 carbon atoms, crystalline hydrofurans with pendant chains having at least 14 carbon atoms, and similar structures known to those skilled in the art.

The adhesive polymer of compositions of the invention comprise 0 to about 70 parts by weight per 100 parts by weight of adhesive polymer of at least one waxy, soft monomer having an average pendant alkyl carbon length of at least 14, typically no more than 50, carbon atoms.

Acid or Base Functional Unit

Illustrative examples of suitable acidic comonomers include organic carboxylic acids comprising 3 to 12 carbon atoms and having generally 1 to 4 carboxylic acid moieties. Nonlimiting examples of such monomers acrylic acid, methacrylic acid, itaconic acid, fumaric acid, crotonic acid, maleic acid, b-carboxyethylacrylate and the like.

Illustrative examples of suitable basic comonomers include N,N-dimethyl-aminoethyl (methyl)acrylate, N,N-dimethylaminopropyl (meth)acrylate, t-butylaminoethyl (methyl)acrylate and N,N-diethylamino (meth)acrylate, N-vinyl pyrrolidone, N-vinyl caprolactom, (meth)acrylamide or N,N-dimethyl acrylamide.

The adhesive polymer of compositions of the invention comprise 0 to about 10, typically preferably from about 0.5 to about 3, parts by weight per 100 parts by weight of adhesive polymer of a monomer having acid or base functionality. Adhesive compositions made with adhesive polymer compositions comprising too little of such acid or base functional unit will tend to have slightly diminished adhesion whereas those made with compositions comprising too much of such component will tend to be hard to apply and very stringy.

Macromer

Formulations of the invention contain macromer(s). Suitable macromers are prepared from the corresponding prepolymers of, for example, octadecyl acrylate (ODA), behenyl acrylate (BeA) and mixtures of tetradecyl acrylate (TDA), tetradecyl methacrylate (TDMA), hexadecyl acrylate (HDA), hexadecyl methacrylate (HDMA), ODA, octadecyl methacrylate (ODMA), eicosyl acrylate (ECA), eicosyl methacrylate (ECMA), BeA and behenyl methacrylate (BeMA) and the like, such that the final macromer melting temperatures ($T_m$) in within the range of from about 35° to about 70° C. and more preferably from about 45° to about 60° C. The macromers are incorporated into the semi-crystalline polymers via standard polymerization techniques for the glue crayon polymers described herein. These functionally reactive macromers include, but are not limited to the specific macromers just mentioned.

The preferred macromer/semi-crystalline polymers have a tacky backbone, after friction activation and have pendent macromer groups that are waxy or waxy-hard, suspended therefrom. While not intending to be bound by theory, it is believed the crystalline/waxy, waxy-hard segments reinforce the polymer by co-crystallizing between polymer chains, thus improving the writability and provide higher temperature stability to the polymer. This is demonstrated in the DSC's of these polymers in that a higher temperature peak is obtained around 47° to 49° C. for the ODA macromers and around 68° C. for the BeA macromers. As the macromer content is increased, the intensity of these peaks increase. The higher stability that the macromers provide can also be demonstrated using a simple melting test in which the temperature that the polymer "melts and flows" is determined.

The adhesive polymer of compositions of the invention comprise 0 to about 40, typically preferably from 0 to about 30, parts by weight per 100 parts by weight of adhesive polymer of functional or non-functional macromer having a $T_m$ from about 35° C. to about 120° C. Adhesive compositions comprising too much of such component will tend to be hard and brittle, providing poor adhesive transfer to paper.

Tackifier

Additionally, tackifiers could be mixed with the polymer and include any such tackifiers known to those skilled in the art, for example, wood rosins, wood rosin esters, terpenes, $C_5$ and $C_9$ aliphatic and aromatic tackifiers, and the like. Optionally, plasticizers could also be added.

In many embodiments, adhesive compositions of the invention comprise 0 to about 50, typically preferably from about 5 to about 40, parts by weight per 100 parts by weight of adhesive composition of at least one tackifier. Adhesive compositions of the invention containing too little tackifier may tend to provide poorer adhesion than desired whereas those containing too much tackifier may tend to exhibit poorer writability than is desired.

Crystalline Additive

Crystalline additives with varying functionality such as acids, diacids, alcohols, diols, waxes, etc. based on linear hydrocarbons can be added to the acrylate polymers to provide higher temperature stability to the glue crayons where needed.

Crystalline additives are melt miscible with the acrylate polymers (i.e., will form a transparent single phase system when molten) and upon cooling, they partially or completely crystallize and form finely dispersed phases in the polymer. This is thought to reinforce the acrylate copolymer without damaging the polymer's cohesive strength. The additive/polymer blends exhibit rapid set-up time due to the additive; for example when poured from a 120° C. melt, the blend becomes opaque within seconds and solidifies within minutes.

Crystalline additives provide improved storage stability (i.e., resistance to creep and flow) to the polymers up to the melting point of the crystalline additives. Moderate levels of from about 3 to about 50 wt. % of the additives do not spoil adhesion and may in fact tend to accelerate re-crystallization by acting as nucleating agents. Higher loading levels reduce adhesion and cause bond failure.

To be useful herein, the additives crystallize (at least partially) from the base polymer. The additives have an n-alkyl chain length of at least 20 carbons and typically preferably at least 22 carbon atoms, if mono-functional and they have a melting point of at least about 50° C. and typically preferably at least about 70° C. The table at col. 8 of U.S. Pat. No. 5,604,268 lists several crystalline additives and telechelic polymers that are suitable for use herein.

The 40 and 50 carbon length, primary, linear, fully saturated alcohols are particularly effective. Compared to the corresponding linear waxes, the alcohols are more miscible with the more polar acrylate polymers. The alcohol blends have better adhesion than wax blends.

In many embodiments, adhesive compositions of the invention comprise 0 to about 50, in some instances 0 to about 30, parts by weight per 100 parts by weight of adhesive composition of at least one crystalline additive.

Oil

In some embodiments, the adhesive composition will comprise oil to further improve writability of the formulation.

The adhesive composition may comprise from 0 to about 30, typically preferably from about 1 to about 10, parts by weight of oil per 100 parts by weight of adhesive composition. If the composition contains too much oil the composition may tend to provide reduced adhesion and paper tear.

Illustrative examples of oils that may be used in adhesive compositions of the invention include olive oil, glycerin, mineral oil, low molecular weight polyethylene oxide, and low molecular weight polypropylene oxide.

Surfactant

In some embodiments, the adhesive composition will comprise surfactant to improve writability and washability of the composition.

The adhesive composition may comprise from 0 to about 50, typically preferably from about 10 to about 40, parts by weight of surfactant per 100 parts by weight of adhesive composition. Whereas adhesive compositions containing too little surfactant may tend to exhibit less than desired writability and washability performance, those containing unduly high amounts of surfactant may exhibit weaker bond performance and be so soft as to be harder to work with.

Surfactants useful in the present invention include anionic, non-ionic, and cationic surfactants, with non-ionic surfactants typically being preferred as they tend to exhibit greater miscibility with the other components of the adhesive composition than anionic and cationic materials. Illustrative examples of surfactants useful in the present invention include stearic acid, block copolymers of ethylene oxide, propylene oxide, and blends thereof; $C_{12}$ to $C_{50}$ alcohol ethoxylates, alkylphenol ethoxylates, ethoxylated fatty esters, fatty acids, and ethoxylated fatty acids. Illustrative examples of commercially available surfactants suitable for use in the present invention include UNITHOX™ 420, 450, 480, 490, 550, 720, and 750 (from Baker Hughes), TERGITOL™ 15-S-3 and 15-S-20 (from Dow Chemical), PLURONIC® F38, F87, F68, F98, F127, and P85 (from BASF), and TETRONIC® 904, 908, 1107, 1304 (from BASF).

Fillers and Other Additives

Fillers such as calcium carbonate, silica, bentonite clays, glass spheres and bubbles, wood flour etc. can be readily mixed into the glue crayon polymers by melt mixing. Colorants such as dyes, pigments etc. can be used as desired. Anti-oxidants can be used to reduce off coloration of the polymers during the heat processing. Overcoats, such as the fillers just mentioned or other materials such as higher melting acrylate polymers or copolymers and the like, with a $T_m$ greater than 38° C., paper, paper liners, plastic films, etc. may be used to reduce any perception of tack that may be experienced due to the characteristics of the glue crayon polymer. The overcoat may enhance the overall (breaking) strength of the crayon, defined as resistance to fracture when placed in a flexural stress. The amounts of such fillers are amounts effective to produce the effects commonly associated with such fillers.

In many embodiments, adhesive compositions of the invention comprise 0 to about 50 parts by weight per 100 parts by weight of adhesive composition of at least one filler.

Applications

The advantageous properties of the adhesive formulations of the invention permit them to be used in glue crayon form, i.e., hand held sticks with simple paper wrapping. No special containers such as plastic cylinders with air-tight caps are required.

The glue crayons of this invention will be useful school, home, and office applications such as a method to deliver a controlled quantity of an adhesive to a specific application site/area for light-duty, adhesion tasks with paper, cardboard, wood, craft materials, etc.

Desired Embodiments

Preferred compositional proportion ranges and alternative selections of various components of adhesive compositions of the invention are described herein. Any preferred selection (i.e., compositional proportion or material selection) disclosed herein may be used singly or simultaneously with any one or more other preferred selection (i.e., compositional proportion or material selection), for instance, to optimize performance for a specific desired application. All such combinations are intended to be disclosed by this description; for clarity, all such combinations are not specifically recited herein. Those skilled in the art will be able to readily formulate specific embodiments of adhesive compositions of the invention optimized for desired applications.

EXAMPLES

The invention will be further explained with reference to the following illustrative examples.
Acronyms and Abbreviations Used:

| | |
|---|---|
| IOA | isooctyl acrylate |
| MMA | methyl methacrylate |
| IBOA | isobornyl acrylate |
| ODA | octadecyl acrylate |
| ODA Mac | octadecyl acrylate macromer |
| SMA | stearyl methacrylate |
| AA | acrylic acid |
| BuMA | n-butyl methacrylate |
| BzMA | benzyl methacrylate |
| DSC | differential scanning calorimetry |
| mg | milligram |
| $T_g$ | glass transition temperature |
| $T_m$ | melting temperature |

Analytical Methods

Melting Temperature: Melting temperatures ($T_m$) were measured using a TA instruments Q2000 Differential Scanning calorimeter. Approximately 5 mg of sample was placed into a sample pan. The sample was equilibrated at −20° C. and heated to 120° C. at 10° C./min under a purge of $N_2$ at 50 mL/min. The melting point was taken as the peak of the first observed endotherm.

Writability: Writability was measured subjectively and was defined as the ease of deposition of the adhesive onto a substrate and was rated on a scale of 1 to 5 with 5 being the most writable or easiest to apply. A 3 rating indicated that the adhesive applied evenly across the area of deposition with a single stroke. A higher rating indicated more adhesive deposition, and a lower rating indicated poor deposition. The adhesive was held and used as one would hold a writing utensil to deposit the adhesive onto a paper substrate.

Finger Tack: Finger tack was determined by depositing the adhesive onto a substrate, waiting 5 seconds after application, and touching with a finger. Performance was rated on a 1-5 scale with 5 being the most aggressive tack.

Open Time: Open time was the time that the adhesive remained tacky, and was assessed similarly to writability and finger tack.

Paper Tear: Paper tear was assessed by depositing adhesive onto a paper substrate, waiting 5 seconds, and then placing a strip of paper over the deposited adhesive and pressing down with finger pressure. After approximately five minutes, the strip was peeled back at a moderate rate and any paper tear or fiber pulling was observed. If the paper tore or paper fibers were pulled from either substrate, a Y ranking was awarded, otherwise, an N ranking was awarded.

Washability: Washability was evaluated as follows. Adhesive was manually applied to a 2 inch by 2 inch square of cotton fabric (100% cotton). A deposit of adhesive was visible to the unaided eye and apparent to touch on each fabric swatch. The fabric was then washed in a consumer GE washing machine using hot wash and cold water rinse and standard laundry detergent. After the washing cycle was complete the fabric samples were then transferred to a standard GE dryer where they were dried on the "hot" cycle until they were dry to the touch. Upon removal from the dryer the fabric samples were again examined by unaided eye and touch by hand. If no adhesive residue was detected on the fabric sample, the formulation was rated Y for washable.

Examples 1-17

A series of adhesive compositions were made, varying the amounts of crystalline monomer (ODA), waxy monomer (SMA), macromer (ODAmac), acrylic acid (AA), and low $T_g$ monomer (varied). Three low $T_g$ monomers were utilized: IOA (homopolymer, $T_g$ about −54° C.), BuMA (homopolymer, $T_g$ about 20° C.), and BzMA (homopolymer, $T_g$ about 54° C.). Compositions of these adhesives are shown in Table 1. All of the examples formed adhesive crayons that varied in texture from sticky and slightly gummy to hard and somewhat brittle. Table 2 illustrates qualitative results for these adhesives, illustrating that Examples 1-12 are preferred examples, whereas Examples 13-17 are less preferred.

TABLE 1

| Example | ODA (wt %) | SMA (wt %) | AA (wt %) | ODA Mac (wt %) | Low $T_g$ Monomer (wt %) | Monomer |
|---|---|---|---|---|---|---|
| 1 | 5.0 | 70.0 | 1.0 | 0.0 | 24.0 | BzMA |
| 2 | 5.0 | 70.0 | 1.0 | 0.0 | 24.0 | BzMA |
| 3 | 38.0 | 31.2 | 2.8 | 3.5 | 24.5 | IOA |
| 4 | 16.0 | 41.0 | 1.5 | 16.0 | 25.0 | IOA |
| 5 | 26.4 | 27.1 | 0.5 | 32.0 | 14.0 | BuMA |
| 6 | 60.0 | 0.0 | 0.5 | 0.0 | 39.5 | BuMA |
| 7 | 35.5 | 50.0 | 0.5 | 0.0 | 14.0 | IOA |
| 8 | 23.6 | 17.4 | 0.5 | 8.5 | 50.0 | BzMA |
| 9 | 23.6 | 17.4 | 0.5 | 8.5 | 50.0 | BzMA |
| 10 | 10.0 | 50.0 | 1.8 | 24.2 | 14.0 | BuMA |
| 11 | 34.5 | 30.3 | 1.2 | 6.6 | 27.3 | BuMA |
| 12 | 39.1 | 44.4 | 2.5 | 0.0 | 14.0 | BuMA |
| 13 | 88.0 | 0.0 | 5.0 | 0.0 | 7.0 | BuMA |
| 14 | 5.0 | 0.0 | 1.0 | 30.0 | 64.0 | BzMA |
| 15 | 88.0 | 0.0 | 1.0 | 0.0 | 11.0 | IOA |
| 16 | 5.0 | 56.0 | 5.0 | 30.0 | 4.0 | IOA |
| 17 | 10.0 | 14.0 | 1.0 | 15.0 | 60.0 | BzMA |

TABLE 2

| Example | Writability (1-5) | Finger Tack (1-5) | Open Time (s) | Paper Tear (Y/N) |
|---|---|---|---|---|
| 1 | 2 | 4 | 250 | Y |
| 2 | 2 | 5 | 55 | Y |
| 3 | 3.5 | 5 | 30 | Y |
| 4 | 4 | 4 | 74 | Y |
| 5 | 4 | 4 | 5 | Y |
| 6 | 3 | 4 | 5 | Y |
| 7 | 4 | 2 | 30 | Y |
| 8 | 2 | 3 | 25 | Y |
| 9 | 2 | 3 | 10 | Y |
| 10 | 2 | 5 | 240 | Y |
| 11 | 2 | 5 | 5 | Y |
| 12 | 1 | 5 | 300 | Y |
| 13 | 2 | 0 | 0 | N |
| 14 | 2 | 0 | 0 | N |
| 15 | 1 | 0 | 0 | N |
| 16 | 2 | 0 | 0 | N |
| 17 | 2 | 0 | 0 | N |

Example 18 and Comparative Example C1

Two additional adhesive compositions, Example 18 and Comparative Example C1, were made and formed into glue crayons. The composition of each is shown in Table 3.

TABLE 3

| Component | Ex. 18 | Ex. C1 |
|---|---|---|
| ODA | 15.2 | 15.2 |
| SMA | 44.6 | 44.6 |
| IOA | 21.2 | 0 |
| MMA | 0 | 21.2 |
| AA | 0.5 | 0.5 |
| ODA Macromer | 17.7 | 17.7 |

In Example 18, isooctyl acrylate ($T_g$ about −58° C.) was used as the non-crystalline monomer in accordance with the invention. In Comparative Example C1, methyl methacrylate ($T_g$ about 105° C.) was used as the non-crystalline monomer.

The Comparative Example C1 glue crayon exhibited poor adhesion, poor writability, and was significantly harder than the Example 18 composition. However, the IOA-based sample, which did not contain any "tackifying monomeric unit" as defined by U.S. Pat. No. 5,604,268, exhibited excellent adhesion, lubricity, open times.

Table 4 illustrates $T_m$, writability, open time, and paper tear for these two adhesive compositions.

TABLE 4

| Example | $T_m$ (° C.) | Writability | Finger Tack | Open Time (s) | Paper Tear (Y/N) |
|---|---|---|---|---|---|
| 18 | 30 | 4.5 | 3 | 120 | Y |
| C1 | 40 | 1 | 1 | <5 | N |

Examples 19-22

For Examples 19-22, semi-crystalline adhesive polymers were prepared using the following composition (amounts in parts by weight).

TABLE 5

| Component | Ex. 19 | Ex. 20 | Ex. 21 | Ex. 22 |
|---|---|---|---|---|
| ODA | 18.7 | 18.7 | 18.3 | 15.5 |
| ODMA | 54.7 | 54.7 | 54 | 45.2 |
| IOA | 26 | 26 | 26 | 21.6 |
| AA | 0.65 | 0.65 | 1.5 | 0.5 |
| ODA Macromer | 0 | 0 | 0 | 17.2 |

Examples 23-26

For Examples 23-26, the semi-crystalline adhesive polymers of Examples 19-22 were blended to form preferred adhesive compositions of the invention as follows.

TABLE 6

| Component | Ex. 23 | Ex. 24 | Ex. 25 | Ex. 26 |
|---|---|---|---|---|
| Semi-crystalline adhesive polymer from Example | 19 | 20 | 21 | 22 |
| Weight % of semi-crystalline adhesive polymer | 59 | 53 | 48 | 48 |
| ARKON ™ M-100 | 18 | 16 | 14 | 14 |
| UNITHOX ™ 420 | 24 | 26 | 0 | 10 |
| UNITHOX ™ 450 | 0 | 0 | 0 | 10 |
| TETRONIC ® 1304 | 0 | 0 | 19 | 19 |
| Stearic acid | 0 | 0 | 19 | 0 |
| Olive oil | 0 | 5 | 0 | 0 |

In each of Examples 23-26, the adhesive composition was found to yield superior results with a Writability rating of 4, a Paper Tear rating of Y, and a Washability rating of Y.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. The complete disclosure of all patents, patent documents, and publications cited herein are incorporated by reference.

What is claimed is:
1. A friction-activated adhesive composition comprising:
(a) from about 50 to about 100 parts by weight of a copolymer comprising the reaction product of the following monomers:
 (i) about 5 to about 96 parts by weight per 100 parts by weight of a $C_n$ (meth)acrylic monomer having a pendant alkyl unit of at least 16 carbon atoms, wherein a homopolymer of the (meth)acrylic monomer having a pendant alkyl unit of at least 16 carbon atoms has a melting temperature of about 45° C. to about 68° C.,
 (ii) about 12 to about 59 parts by weight per 100 parts by weight of a non-crystalline $C_n$ (meth)acrylic monomer, wherein a homopolymer of the non-crystalline $C_n$ (meth)acrylic monomer has a glass transition temperature of about 40° C. or less,
 (iii) a waxy, soft $C_n$ (meth)acrylic monomer having a pendant alkyl unit of at least 14 carbon atoms, wherein a homopolymer of the waxy, soft $C_n$ (meth)acrylic monomer having a pendant alkyl unit of at least 14 carbon atoms has a melting temperature of about 25° C. to about 44° C., and
 (iv) from about 0.5 to about 3 parts by weight per 100 parts by weight of an acidic comonomer comprising a carboxylic acid comprising from 3 to 12 carbon atoms and having from 1 to 4 carboxylic acid moieties; and (b) a tackifier.

2. The friction-activated adhesive composition of claim 1, wherein
the waxy, soft Cn (meth)acrylic monomer having a pendant alkyl unit of at least 14 carbon atoms is present in the copolymer in an amount no more than 70 parts by weight per 100 parts.

3. The friction-activated adhesive composition of claim 1, further comprising
(c) a macromer having a melting temperature of about 35° C. to about 70° C.

4. The composition of claim 3, wherein the macromer is the reaction product of one or more prepolymers of octadecyl acrylate, behenyl acrylate, tetradecyl acrylate, hexadecyl methacrylate, octadecyl methacrylate, eicosyl acrylate, eicosyl methacrylate, and behenyl methacrylate.

5. The friction-activated adhesive composition of claim 1, further comprising
(d) a crystalline additive.

6. The friction-activated adhesive composition of claim 5, wherein the amount of crystalline additive is about 3% to about 50% by weight of the composition.

7. The friction-activated adhesive composition of claim 5, wherein the crystalline additive comprises an alcohol with an n-alkyl chain length of at least 22 carbon atoms.

8. The friction-activated adhesive composition of claim 7, wherein the crystalline additive has a melting point of about 50° C. or greater.

9. The friction-activated adhesive composition of claim 1, wherein the composition comprises about 5 to about 40 parts by weight tackifier per 100 parts by weight of the adhesive composition.

10. The friction-activated adhesive composition of claim 1, further comprising a surfactant.

11. The friction-activated adhesive composition of claim 1, further comprising an oil.

12. A friction-activated adhesive application device comprising
an adhesive crayon comprising the composition of claim 1; and
a removable wrapper.

13. A method of using the friction-activated adhesive application device of claim 1 comprising rubbing the crayon onto a substrate to form a tacky adhesive deposit on the substrate.

14. The friction-activated adhesive composition of claim 1, wherein the acidic comonomer comprises one or both of acrylic acid and methacrylic acid.

15. The friction-activated adhesive composition of claim 1, wherein the friction-activated adhesive composition has a melting temperature above room temperature, resists flowing at temperatures up to about 50° C., and is melted by frictionally generated heat when formed into a crayon and rubbed on a substrate.

16. A friction-activated adhesive composition comprising:
(a) from about 50 to about 100 parts by weight of a copolymer comprising the reaction product of the following monomers
(i) about 5 to about 96 parts by weight per 100 parts by weight of a $C_n$ (meth)acrylic monomer having a pendant alkyl unit of at least 16 carbon atoms, wherein a homopolymer of the (meth)acrylic monomer having a pendant alkyl unit of at least 16 carbon atoms has a melting temperature of about 45° C. to about 68° C.,
(ii) about 12 to about 59 parts by weight per 100 parts by weight of a non-crystalline $C_n$ (meth)acrylic monomer, wherein a homopolymer of the non-crystalline $C_n$ (meth)acrylic monomer has a glass transition temperature of about 40° C. or less, and
(iii) a waxy, soft $C_n$ (meth)acrylic monomer having a pendant alkyl unit of at least 14 carbon atoms, wherein a homopolymer of the waxy, soft $C_n$ (meth) acrylic monomer having a pendant alkyl unit of at least 14 carbon atoms has a melting temperature of about 25° C. to about 44° C.;

(b) at least one tackifier, wherein the tackifier is present in an amount up to 50 parts by weight;

(c) 0 to about 50 parts by weight of at least one crystalline additive;

(d) 0 to about 30 parts by weight of at least one oil; and (e) 0 to about 50 parts by weight of at least one surfactant.

17. The friction-activated adhesive composition of claim 16, wherein
the waxy, soft Cn (meth)acrylic monomer having a pendant alkyl unit of at least 14 carbon atoms is present in the copolymer in an amount no more than 70 parts by weight per 100 parts.

18. The friction-activated adhesive composition of claim 16, further comprising
(d) a macromer having a glass transition temperature of about 35° C. to about 70° C.

19. The composition of claim 18, wherein the macromer is the reaction product of one or more prepolymers of octadecyl acrylate, behenyl acrylate, tetradecyl acrylate, hexadecyl methacrylate, octadecyl methacrylate, eicosyl acrylate, eicosyl methacrylate, and behenyl methacrylate.

20. The friction-activated adhesive composition of claim 16, further comprising
(f) a crystalline additive.

21. The friction-activated adhesive composition of claim 16, wherein the amount of the at least one crystalline additive is about 3% to about 50% by weight of the composition.

22. The friction-activated adhesive composition of claim 16, wherein the crystalline additive comprises an alcohol with an n-alkyl chain length of at least 22 carbon atoms.

23. The friction-activated adhesive composition of claim 22, wherein the crystalline additive has a melting point of about 50° C. or greater.

24. The friction-activated adhesive composition of claim 16, wherein the composition comprises about 5 to about 40 parts by weight tackifier per 100 parts by weight of composition.

25. The friction-activated adhesive composition of claim 16, further comprising a surfactant.

26. The friction-activated adhesive composition of claim 16, further comprising an oil.

27. A friction-activated adhesive application device comprising
an adhesive crayon comprising the composition of claim 16; and
a removable wrapper.

28. A method of using the friction-activated adhesive application device of claim 16 comprising rubbing the crayon onto a substrate to form a tacky adhesive deposit on the substrate.

* * * * *